L. S. EVERETT.
PITMAN.
APPLICATION FILED MAR. 31, 1914.
1,182,663.
Patented May 9, 1916.
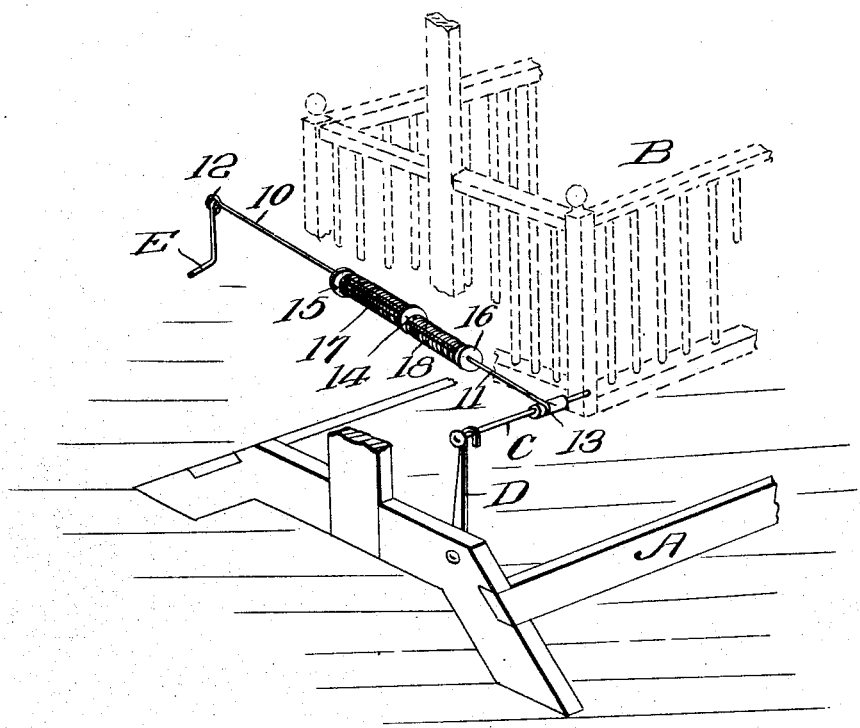
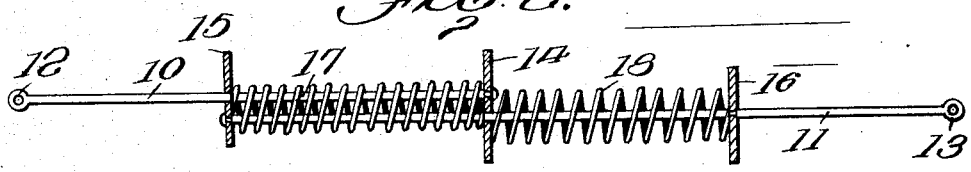
Inventor
L. S. Everett.
By [signature], Attorneys

UNITED STATES PATENT OFFICE.

LAFAYETT S. EVERETT, OF MIDDLESEX, NORTH CAROLINA.

PITMAN.

1,182,663.  Specification of Letters Patent.  Patented May 9, 1916.

Application filed March 31, 1914. Serial No. 828,557.

*To all whom it may concern:*

Be it known that I, LAFAYETT S. EVERETT, citizen of the United States, residing at Middlesex, in the county of Nash and State of North Carolina, have invented certain new and useful Improvements in Pitmen, of which the following is a specification.

This invention contemplates an improved pitman and has as its primary object to provide a device of this character especially adapted to form a connection between a swinging cradle and a suitable motor so that the cradle will be rocked as the motor is allowed to operate.

The invention has as a further object to provide a pitman adapted to form a yieldable connection between the motor and the cradle so that a change in the direction of the swinging movement of the cradle will not be accompanied by a sudden jar or shock and the swinging movement of the cradle thus maintained smooth and uninterrupted. And a still further object of the invention is to provide an improved pitman which, while being especially adapted for the use above indicated, will also provide an efficient device when employed in other suitable adaptations.

Other and incidental objects will appear as the description proceeds and in the drawings wherein I have illustrated the preferred embodiment of the invention and wherein similar reference characters designate corresponding parts throughout the several views, Figure 1 is a fragmentary perspective view showing the manner in which my improved pitman may be arranged to form a suitable connection between a motor and a swinging cradle, the portion of the cradle and its base illustrated, being conventionally shown, Fig. 2 is a detail side elevation of the pitman partly in section and showing the springs, which are interposed between the terminals of the rod sections of the pitman, in normal balancing relation, and Fig. 3 is a detail side elevation of the pitman showing one of the springs contracted and the other one expanded.

In carrying out my invention, I employ coacting rods 10 and 11 respectively. The outer terminal of the rod 10 is provided with an eyelet or bearing 12 while the outer terminal of the rod 11 is provided with an eyelet or bearing 13. The inner terminal of the rods are overlapped. Connected to the inner terminal of the rod 10, is a guide member or disk 14 while a similar disk or member 15 is connected to the inner terminal of the rod 11. The guide members 14 and 15 are formed to freely receive the free extremities of the said rods and are adapted to support the rods in substantially parallel relation for longitudinally shifting movement relative to each other. Fixed to the rod 11 adjacent the free outer end thereof, is a stop 16 which may also be formed as a suitable disk similar to the members 14 and 15.

As previously intimated, I have designed my improved pitman so that it will act as a shock absorber for neutralizing any shocks or jars incident to the reversal in the swinging movement of the cradle body and for this purpose, have equipped the pitman with a pair of helical springs 17 and 18. The spring 17 which is of the expansive type, is wound about the overlapping terminals of the rods 10 and 11 and is interposed between the guide members 14 and 15 against which the terminals of the said spring engage to normally urge the said guide members apart. The spring 18 is wound about the rod 11 to engage, at its extremities, with the guide member 14 and the stop 16 respectively, this spring normally acting to balance the spring 17, as shown in Fig. 2 of the drawing.

In Fig. 1, I have illustrated my improved pitman in connection with a conventional type of cradle having a base A upon which is swingingly supported, a cradle body B, having a rod C associated therewith. Detachably engaging the outer end of the rod C for normally holding the cradle against swinging movement is a latch D. In using my improved pitman, it is intended that a suitable type of motor such as a spring motor shall be associated with the cradle and the crank of such motor is indicated at E. In mounting the pitman, the bearing 12 of the rod 10 is connected to the crank E while the bearing member 13 of the rod 11 is connected to the rod C of the cradle. It will now be seen that when the cradle body B reaches its highest point when swinging in one direction and the crank E having completed a half revolution starts to move away from the base A, the pitman will be elongated against the tension of the spring 17. This elongation of the pitman will act to exert a yieldable pull upon the cradle body tending to reverse the direction of movement thereof so that each time the cradle body alternately approaches the ends of the arc in which it swings, the pitman will act to gently reverse the direction of movement of the cradle body to impart thereto a smooth and uninterrupted swinging movement. The spring 17 will, of course, offer resistance only to the elongation of the pitman such as results from the movement of the guide members 14 and 15 toward each other. The contraction of the pitman, which results in the separation of the said guide members, is yieldably resisted by the spring 18, in the manner best shown in Fig. 3 of the drawings.

It will therefore be seen that I provide a very simple and efficient construction for the purpose set forth and while my improved pitman is especially adapted for use in connection with motor cradles, as above described, still, as will also be seen, the device will operate with equal efficiency in any other suitable adaptation and I therefore do not wish to limit myself to the specific use of the invention indicated.

Having thus described my invention, what I claim as new is:—

1. A pitman including a pair of rods having their inner extremities overlapped, guide plates carried by the inner extremities of said rods, the guide plate of each rod being formed to slidably receive the intermediate portion of the other rod, a stop plate carried by one of said rods, resilient means bearing between said guide plates, and resilient means bearing between one of the plates and said stop plate.

2. A pitman including overlapping rods, a guide carried by each of said rods and disposed to slidably receive the other rod, a stop plate carried by one of said rods, resilient means interposed between the guide plates, and resilient means interposed between one of said guides and said stop plate.

3. A pitman including overlapping rods adapted for movement longitudinally of each other, resilient means disposed to resist the relative movement of the rods in one direction, and resilient means disposed to resist the relative movement of the rods in the opposite direction.

4. A pitman including overlapping members adapted for movement longitudinally of each other, resilient means carried by the overlapping portions of the members and disposed to resist the relative movement of the members in one direction, and resilient means carried by one of said members and disposed to resist the relative movement of the members in the opposite direction.

5. A pitman including overlapping members, a fixed guide carried by each of said members and formed to slidably receive the other member, a stop carried by one of said members, a spring surrounding the overlapping portions of the members and bearing between said guides, and a spring surrounding one of said members and bearing between one of said guides and said stop.

6. A pitman including a pair of rod sections having their adjacent terminals overlapped, a guide plate carried by each section and having an eccentrically located opening slidably receiving the overlapped terminal of the other rod section, a helical spring wound around the sections and interposed between the guide plates thereof, a stop plate carried by one of the rod sections, and a helical spring wound upon the said stop plate carrying section and bearing at one end against the stop plate and at its other end against the guide plate of the other rod section, said springs being disposed to resist both expansion and contraction of the pitman.

In testimony whereof I affix my signature in presence of two witnesses.

LAFAYETT S. EVERETT. [L. S.]

Witnesses:
J. J. KEMP,
K. W. BALLENTINE.

Copies of this patent may be obtained for five cents each, by addressing the "Commissioner of Patents, Washington, D. C."